(12) United States Patent
Yang et al.

(10) Patent No.: US 10,067,001 B2
(45) Date of Patent: Sep. 4, 2018

(54) THERMOCOUPLE FIXING DEVICE AND TEMPERATURE MEASURING APPARATUS

(71) Applicant: BEIJING NAURA MICROELECTRONICS EQUIPMENT CO., LTD., Beijing (CN)

(72) Inventors: Shuai Yang, Beijing (CN); Jinwei Dong, Beijing (CN); Yanxiao Lu, Beijing (CN)

(73) Assignee: BEIJING NAURA MICROELECTRONICS EQUIPMENT CO., LTD., Beijing (CN)

( * ) Notice: Subject to any disclaimer, the term of this patent is extended or adjusted under 35 U.S.C. 154(b) by 877 days.

(21) Appl. No.: 14/501,024

(22) Filed: Sep. 30, 2014

(65) Prior Publication Data

US 2015/0153238 A1   Jun. 4, 2015

(30) Foreign Application Priority Data

Nov. 29, 2013   (CN) .......................... 2013 1 0631252

(51) Int. Cl.
*G01K 7/02* (2006.01)
*G01K 1/14* (2006.01)

(52) U.S. Cl.
CPC ................ *G01K 7/02* (2013.01); *G01K 1/14* (2013.01)

(58) Field of Classification Search
CPC ............... G01K 1/14; G01K 7/02; G01K 5/04
USPC ......... 73/866.5; 374/179, 208, 163; 136/200
See application file for complete search history.

(56) References Cited

U.S. PATENT DOCUMENTS

| | | | | |
|---|---|---|---|---|
| 4,357,824 A | * | 11/1982 | Foss .......................... | G01N 7/14 374/54 |
| 2008/0205485 A1 | * | 8/2008 | Takahashi ................ | G01K 1/14 374/208 |

* cited by examiner

*Primary Examiner* — Daniel S Larkin
*Assistant Examiner* — Anthony W Megna Fuentes
(74) *Attorney, Agent, or Firm* — Tianchen LLC

(57) ABSTRACT

A thermocouple fixing device and a temperature measuring apparatus including a fixing joint, a sealing sleeve, a clamping piece and a locking nut sequentially sleeved outside the outer cover of the thermocouple is disclosed. The inside end of the fixing joint is fixed on the side wall of the vacuum generation chamber, the outside end of the fixing joint abuts on one end of the sealing sleeve; the two sides of the clamping piece abut on the other end of the sealing sleeve and the inside end of the locking nut, respectively; the internal threads of the locking nut are meshed with the external threads of the fixing joint; the clamping piece has a clamping element and a through hole for clamping the outer over of the thermocouple.

12 Claims, 4 Drawing Sheets

THERMOCOUPLE FIXING DEVICE AND TEMPERATURE MEASURING APPARATUS

CROSS-REFERENCE TO RELATED APPLICATION

This application claims the priority benefit of Chinese patent application serial no. 201310631252.X filed Nov. 29, 2013. The entirety of each of the above-mentioned patent applications is hereby incorporated by reference herein and made a part of this specification.

FIELD OF THE INVENTION

The present invention generally relates to the field of semiconductor device and semiconductor manufacturing, more particularly, to a thermocouple fixing device and a temperature measuring apparatus.

BACKGROUND OF THE INVENTION

In the semiconductor production, the semiconductor heat treatment equipment is an important processing equipment for manufacturing integrated circuits, and is required to have excellent precision and good stability in temperature controlling. During the semiconductor heat treatment, those processes which are susceptible to temperature include oxidation, nitrogenization, dopants diffusion, high temperature anneal, sputter deposition, and plasma treatment. Thus, the temperature has a non-negligible significant influence on the heat treatment effect to the silicon wafer.

For example, a vertical diffusion or oxidation furnace is one of the important semiconductor heat treatment equipment used in the front-end process of the integrated circuit production line. The semiconductor heat treatment equipment mainly consists of a furnace outer shell, an insulation layer, heating units, a reaction tube disposed in the furnace, a boat carrying a plurality of silicon wafers, and an insulation barrel. By keeping a suitable and stable temperature within the reaction tube, a film with good uniformity can be formed on the silicon wafer surface. However, if the temperature in the tube is varied rapidly, the film formed on the silicon wafer surface will not be uniform, which causes lower utilization of the silicon wafer. Therefore, during the heat treatment process, the temperature in the reaction tube must be kept stable and meet the required temperature of the process.

In order to measure the temperature in the reaction tube, the thermocouple is utilized as a temperature measuring device. The thermocouple is generally wrapped by a quartz cover due to the high temperature inside the tube. Since the quartz cover of the thermocouple is fragile, the fixation of the quartz cover is difficult and generally needs a fixing device. However, the thermocouple fixing device is hard to install inside the tube due to the higher cleanliness requirement for the process. Thus, the thermocouple fixing device can only be installed outside the reaction tube by extending one end of the thermocouple into the tube and fixing the other end outside the tube through a support or other simple structures.

During the usage of the conventional thermocouple fixing device, there are some disadvantages as follows, which can be understood by those skilled in the art:

1. Since the other end of the thermocouple cannot be stably fixed, the thermocouple can easily move along the length direction, thereby shifting the measurement position of the thermocouple from the designated position and causing inaccurate measured temperature.

2. Since the quartz cover is generally circular, the thermocouple can be easily rotated along the circumference, thereby also shifting the measurement position of the thermocouple from the designated position, causing measurement error and influencing the process effect.

These two disadvantages mentioned above may cause temperature error during the temperature measurement by the thermocouple in the tube, which further affects the reliability of the heat treatment of the silica wafer, the production efficiency and cost. Therefore, a thermocouple fixing device that can locate and fix the thermocouple in an accurate position within the tube need to be provided to ensure an accurate temperature measurement result of the thermocouple.

SUMMARY OF THE INVENTION

Accordingly, an object of the present invention is to provide a thermocouple fixing device and temperature measuring apparatus which enables accurate positioning and fixation of the thermocouple inside the reaction tube so as to ensure the temperature measurement result of the thermocouple.

To achieve these and other advantages and in accordance with the objective of the invention, the present invention provides a thermocouple fixing device. The thermocouple fixing device includes a fixing joint, a sealing sleeve, a clamping piece and a locking nut sequentially sleeved outside an outer cover of the thermocouple. The inside end of the fixing joint is fixed on the side wall of a vacuum generation chamber, the outside end of the fixing joint abuts on one end of the sealing sleeve; the two sides of the clamping piece abut on the other end of the sealing sleeve and the internal side of the locking nut respectively. The internal threads of the locking nut are meshed with the external threads of the fixing joint. The clamping piece has a clamping element and a through hole for clamping the outer over of the thermocouple.

Preferably, the outside wall of a fixing end of the outer cover of the thermocouple is provided with a positioning groove for positioning the thermocouple front and back; the internal side of the through hole of the clamping piece is provided with an opening matched with the positioning groove.

Preferably, the fixing device further includes wedge bosses positioned at the internal side of the clamping piece; the wedge bosses have a preset distance from each other which is fitted with the external diameter of the outer cover of the thermocouple.

Preferably, the contour of the fixing end of the outer cover is polygonal and is fitted with the contour of the through hole of the clamping piece.

Preferably, the contour of the fixing end of the outer cover is quadrilateral and the contour of the through hole of the clamping piece is also quadrilateral.

Preferably, the clamping piece is flexible.

Preferably, the outside end of the fixing joint has at least two notches; the inside end of the sealing sleeve has at least two positioning protrusions buckled to the notches of the fixing joint.

Preferably, the positioning protrusions are uniformly distributed along the circumference of the inside end of the sealing sleeve.

Preferably, the internal circle of the outside end of the fixing joint has a tapered structure; a sealing ring is positioned between the tapered structure and the positioning protrusions.

Preferably, the sealing sleeve is flexible.

Preferably, the inside end of the fixing joint is rigidly connected with the side wall of the vacuum generation chamber.

Preferably, the outer cover of the thermocouple is a quartz cover.

The present invention also provides a temperature measuring apparatus comprising a reaction chamber, a vacuum generation chamber, an outer cover with a thermocouple provided therein; wherein, an fixing end of the outer cover is fixed by the thermocouple fixing device mentioned above.

According to the thermocouple fixing device and the temperature measuring apparatus of the present invention with simple and compact structures, the thermocouple can be accurately located and fixed in the reaction chamber with no measurement position deviation from the designated position, so as to ensure an accurate temperature measurement result of the thermocouple. In addition, the present invention also has other advantages including convenient installation, less occupied space, high reliability, and easy maintenance, thereby improving the effect of heat treatment process of the silicon wafer.

BRIEF DESCRIPTION OF THE DRAWINGS

In order that the technology scheme of the embodiments according to the present invention may be more fully understood, the accompanying drawings will now be descried simply hereinafter. Obviously, the accompanying drawings in follow description are only some embodiments of the present invention, with reference to which those who skilled in the art can further obtain other accompanying drawings without giving creative work.

DETAILED DESCRIPTION OF THE EMBODIMENTS

The thermocouple fixing device and the temperature measuring apparatus of the present invention will now be described more fully hereinafter with reference to the drawings FIG. 1 to FIG. 10, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 1:
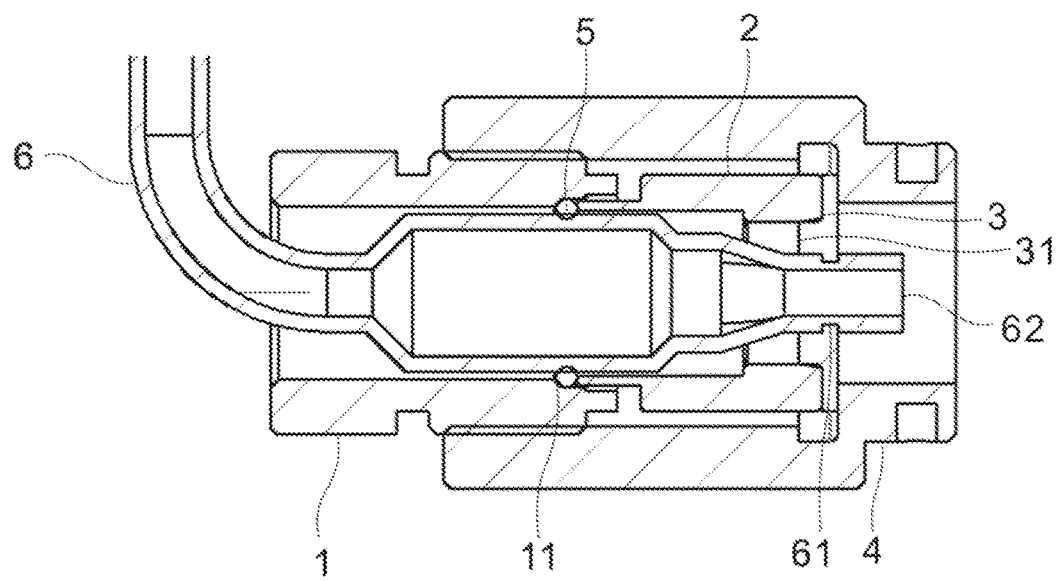
FIG. 1 is an assembly cross-sectional view of the thermocouple fixing device and the outer cover of the thermocouple according to an embodiment of the present invention.
Figure 2:
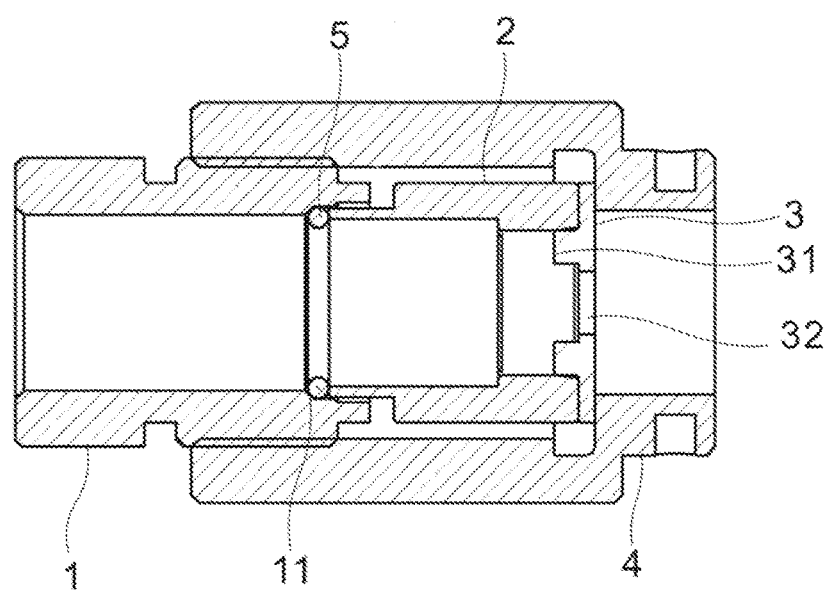
FIG. 2 is an assembly cross-sectional view of the thermocouple fixing device according to an embodiment of the present invention.

FIG. 1 is an assembly cross-sectional view of the thermocouple fixing device and the outer cover of the thermocouple according to the present invention; FIG. 2 is an assembly cross-sectional view of the thermocouple fixing device according to the present invention. As shown in FIG. 1 and FIG. 2, the thermocouple fixing device includes a fixing joint 1, a sealing sleeve 2, a clamping piece 3 and a locking nut 4 sequentially sleeved outside the outer cover 6 of the thermocouple. The inside end of the fixing joint 1 is fixed on the side wall of the vacuum generation chamber 8, the outside end of the fixing joint 1 abuts on one end of the sealing sleeve 2; the two sides of the clamping piece 3 abut on the other end of the sealing sleeve 2 and the internal side of the locking nut 4 respectively. The internal threads of the locking nut 4 are meshed with the external threads of the fixing joint 1. The clamping piece 3 has a clamping element and a through hole for clamping the outer over 6 of the thermocouple.

In the embodiment, the clamping element is positioned at the internal side of the clamping piece for clamping the outer cover 6 of the thermocouple. The outside wall of a fixing end 62 of the outer cover 6 of the thermocouple is provided with a positioning groove 61 for positioning the thermocouple front and back, and the internal side of the through hole of the clamping piece 3 is provided with an opening 32 matched with the positioning groove 61. Through the engagement of the opening 32 and the positioning groove 61, the movement of the outer cover 6 of the thermocouple at front and back positions can be limited, thus to prevent the outer cover 6 of the thermocouple from moving along the length direction.

Additionally, the internal side of the clamping piece 3 is provided with wedge bosses 31 having a preset distance from each other. The preset distance is fitted with the external diameter of the outer cover 6 of the thermocouple. The inside wall of the wedge bosses 31 are fitted tightly to the outer cover 6 of the thermocouple, and the outside wall of the wedge bosses 32 are hold against the sealing sleeve 2. The wedge bosses can further enhance the fixing effect of the outer cover of the thermocouple and prevent the outer cover 6 from moving forward or backward.

According to the present invention, the contour of the fixing end 62 of the outer cover 6 is polygonal fitted to the contour of the through hole of the clamping piece 3. Correspondingly, the positioning groove 61 at the outside wall of the fixing end 62 is also polygonal. The polygonal fixing end 62 of the outer cover can prevent the circumferential rotation of the outer cover 6, so as to further avoid the temperature measurement errors.

In some embodiments of the present invention, the contour of the fixing end 62 of the outer cover 6 is quadrilateral and that of the through hole of the clamping piece 3 is also quadrilateral. Correspondingly, the contour of the fixing end 62 of the outer cover 6 can also be a triangle, a pentagon, a hexagon and so on.

Figure 3:
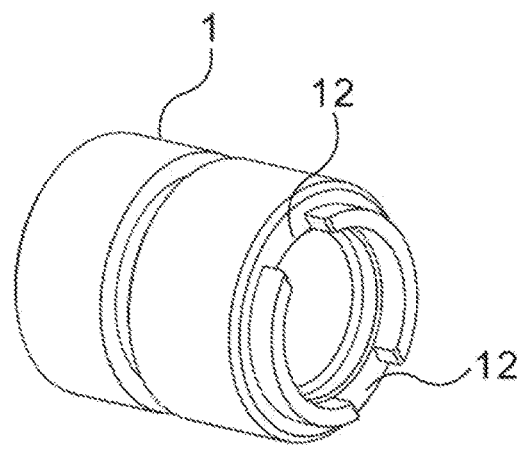
FIG. 3 is a structural view of the fixing joint of the thermocouple fixing device shown in FIG. 2.

FIG. 3 is a structural view of the fixing joint of the thermocouple fixing device. The inside end of the fixing joint 1 is rigidly connected with the side wall of the vacuum generation chamber 8, preferably by welding fixation. At least two notches 12 are distributed along the circumference of the outside end of the fixing joint 1, which are buckled to the fixing bosses 31 of the internal side of the sealing sleeve 2, so as to prevent the sealing sleeve from rotating along the circumference. Preferably, the notches 12 are uniformly distributed along the circumference of the fixing joint 1, which provides even force for the fixing joint and reduced positioning errors compared with the notches formed at one side.

Furthermore, the internal circle of the outside end of the fixing joint 1 has a tapered structure 11. A sealing ring 5 is provided between the tapered structure 11 and the fixing bosses 31. The tapered structure 11 is more conducive to the seal of the sealing ring 5 than the planar structure. Wherein the sealing ring 5 is preferred to be flexible, which has a certain amount of deformation and can ensure the seal of the reaction chamber.

Figure 4:
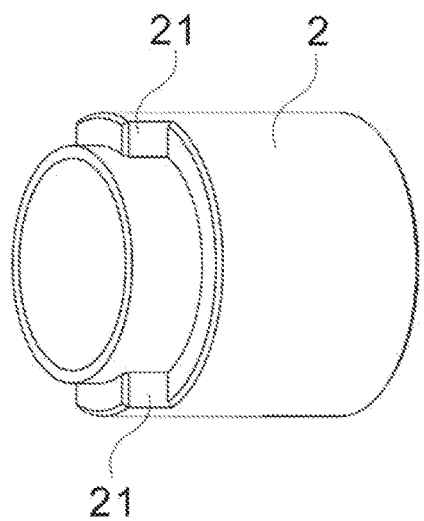
FIG. 4 is a structural view of the sealing sleeve of the thermocouple fixing device shown in FIG. 2.
Figure 5:
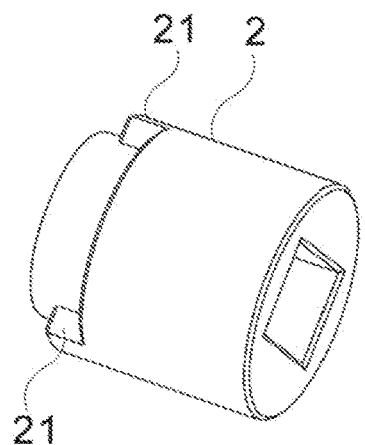
FIG. 5 is another structural view of the sealing sleeve of the thermocouple fixing device shown in FIG. 2.

FIG. 4 and FIG. 5 are structural views of the sealing sleeve of the thermocouple fixing device. As shown in the figures, positioning protrusions 21 are arranged at the internal side of the sealing sleeve 2. The positioning protrusions 21 are buckled to the notches 12 of the fixing joint 1 to fix the sealing sleeve 2. A polygonal cavity is formed within the outside end of the sealing sleeve 2, by which the outer cover 6 of the thermocouple can pass through the sealing sleeve 2.

Figure 6:
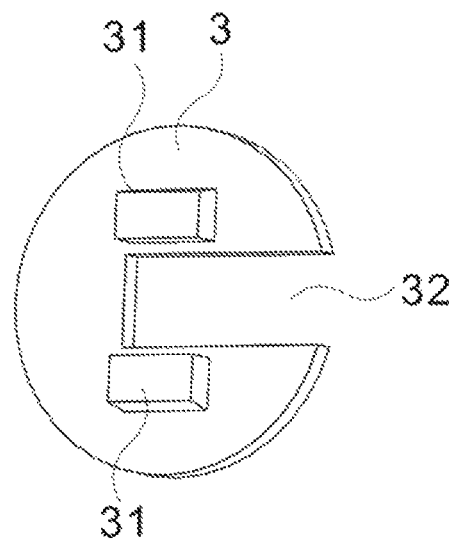
FIG. 6 is a structural view of the clamping piece of the thermocouple fixing device shown in FIG. 2.

FIG. 6 is a structural view of the clamping piece of the thermocouple fixing device. As shown in the figure, an opening 32 fitted with the positioning groove is formed at the internal side of the through hole of the clamping piece 3 to facilitate the installation of the outer cover 6 of the thermocouple. The sealing ring 5 is preferably to be flexible with a certain amount of deformation. The wedge bosses 31 with a preset distance from each other are positioned on the internal sidewall of the clamping piece 3. The preset distance is fitted with the external diameter of the outer cover 6 of the thermocouple. The wedge bosses 31 on the internal side wall are inserted into the sealing sleeve 2 for clamping the outer cover 6 of the thermocouple, which plays a role of location and fixation.

Figure 7:
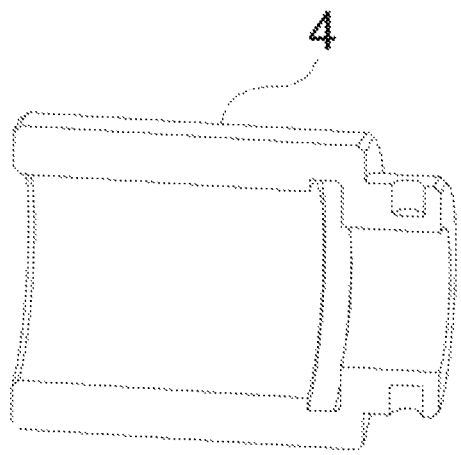
FIG. 7 is a structural view of the locking nut of the thermocouple fixing device shown in FIG. 2.

FIG. 7 is a structural view of the locking nut of the thermocouple fixing device. As shown in the figure, the internal side of the locking nut 4 abuts tightly to the outside of the sealing sleeve 2. The internal threads of the locking nut 4 are meshed with the external threads of the fixing joint 1 to tightly restrain the clamping piece 3 with the sealing sleeve 2 together, so as to fix and protect the outer cover 6 of the thermocouple.

Figure 8:
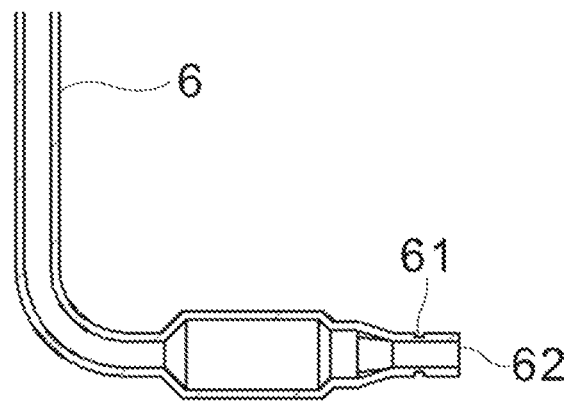
FIG. 8 is a cross-sectional view of the outer cover of the thermocouple according to the embodiment shown in FIG. 1.
Figure 9:
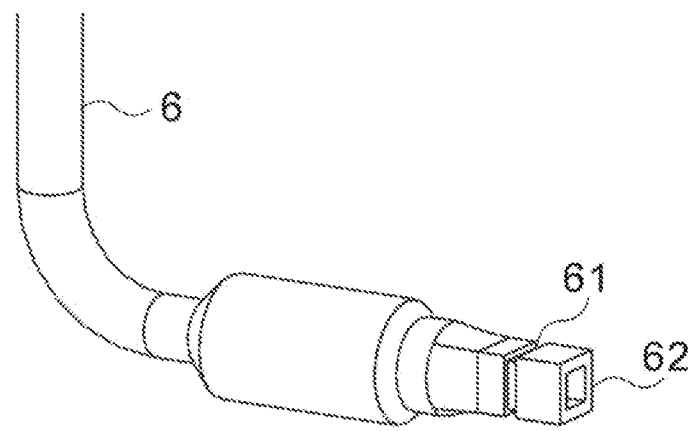
FIG. 9 is a structural view of the outer cover of the thermocouple according to the embodiment shown in FIG. 1.
Figure 10:
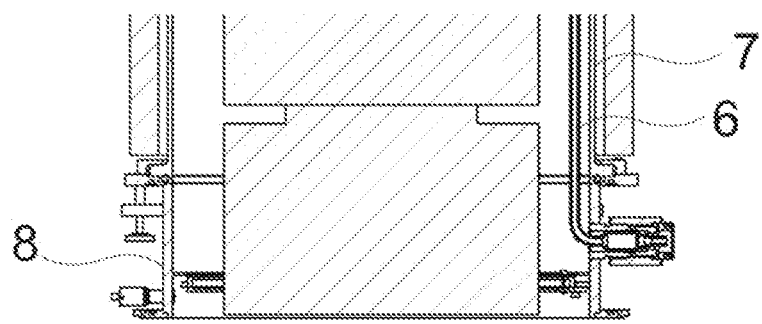
FIG. 10 is a view of the temperature measuring apparatus according to one embodiment of the present invention.

FIG. 8 and FIG. 9 are structural views of the outer cover of the thermocouple. As shown in the figures, the positioning groove 61 is formed at the outside wall of the fixing end 62 of the outer cover 6 for positioning the thermocouple front and back. The contour of the fixing end 62 of the outer cover 6 is polygonal (preferably is quadrilateral) to be fitted to the through hole of the clamp piece 3, so as to prevent the rotation of the outer cover 6 of the thermocouple. Preferably, the outer cover 6 of the thermocouple is a quartz cover.

A temperature measuring apparatus is also provided according to the present invention. The temperature measuring apparatus includes a reaction chamber 7, a vacuum generation chamber 8, an outer cover 6 having a thermocouple therein. The outer cover 6 in the embodiment is mounted inside the reaction chamber 7: the reaction chamber 7 is mounted on the vacuum generation chamber 8; the thermocouple fixing device mentioned above is positioned outside the vacuum generation chamber 8.

In summary, according to the thermocouple fixing device and the temperature measuring apparatus of the present invention with simple and compact structures, the thermocouple can be accurately located and fixed in the reaction chamber with no measurement position deviation from the designated position, so as to ensure an accurate temperature measurement result of the thermocouple. In addition, the present invention also has other advantages including convenient installation, less occupied space, high reliability, and easy maintenance, thereby improving the effect of heat treatment process of the silicon wafer.

While this invention has been particularly shown and described with references to preferred embodiments thereof, if will be understood by those skilled in the art that various changes in form and details may be made herein without departing from the spirit and scope of the invention as defined by the appended claims.

LIST OF REFERENCE NUMERALS 1 fixing joint
2 sealing sleeve
3 clamping piece
4 blocking nut
5 sealing ring
6 outer cover of the thermocouple
7 reaction chamber
8 vacuum generation chamber
11 tapered structure
12 notch of the fixing joint
21 positioning protrusion
31 wedge boss
32 opening of the clamp piece
61 positioning groove of the thermocouple
62 fixing end of the outer cover of thermocouple.

The invention claimed is:

1. A thermocouple fixing device including: a fixing joint, a sealing sleeve, a clamping piece and a locking nut sequentially sleeved outside an outer cover of the thermocouple; a first end of the fixing joint is fixed on the side wall of the vacuum generation chamber, a second end of the fixing joint abuts on a first end of the sealing sleeve; two sides of the clamp piece abut on a second end of the sealing sleeve and a first end of the locking nut, respectively; internal threads of the locking nut are meshed with external threads of the fixing joint; the clamping piece has a clamping element and a through hole for clamping the outer cover of the thermocouple; wherein an outside wall of a fixing end of the outer cover of the thermocouple is provided with a positioning groove for positioning the thermocouple front and back; an internal side of the through hole of the clamping piece is provided with an opening matched with the positioning groove.

2. The thermocouple fixing device according to claim 1, wherein the fixing device further includes wedge bosses positioned at an internal side of the clamping piece; the wedge bosses have a preset distance from each other which is fitted with the external diameter of the outer cover of the thermocouple.

3. The thermocouple fixing device according to claim 1, wherein a contour of a fixing end of the outer cover is polygonal and is fitted with a contour of the through hole of the clamping piece.

4. The thermocouple fixing device according to claim 3, wherein the contour of the fixing portion of the outer cover is quadrilateral and the contour of the trough hole of the clamp piece is also quadrilateral.

5. The thermocouple fixing device according to claim 1, wherein the clamping piece is flexible.

6. The thermocouple fixing device according to claim 1, wherein the outside of the fixing joint has at least two notches; the first end of the sealing sleeve has at least two positioning protrusions buckled to the at least two notches of the fixing joint.

7. The thermocouple fixing device according to claim 6, wherein the at least two positioning protrusions are uniformly distributed along a circumference of the first end of the sealing sleeve.

8. The thermocouple fixing device according to claim 6, wherein an internal circle of the second end of the fixing joint has a tapered structure; a sealing ring is positioned between the tapered structure and the at least two positioning protrusions.

9. The thermocouple fixing device according to claim 8, wherein the sealing sleeve is flexible.

10. The thermocouple fixing device according to claim 1, wherein the first end of the fixing joint is rigidly connected with the side wall of the vacuum generation chamber.

11. The thermocouple fixing device according to claim 1, wherein the outer cover of the thermocouple is a quartz cover.

12. A temperature measuring apparatus comprising a reaction chamber, a vacuum generation chamber, an outer cover with the thermocouple provided in; wherein, a fixing end of the outer cover is fixed by the thermocouple fixing device according to claim 1.

\* \* \* \* \*